United States Patent
Herr et al.

(10) Patent No.: US 11,349,964 B2
(45) Date of Patent: May 31, 2022

(54) SELECTIVE TCP/IP STACK RECONFIGURATION

(71) Applicant: INTERNATIONAL BUSINESS MACHINES CORPORATION, Armonk, NY (US)

(72) Inventors: David Anthony Herr, Cary, NC (US); Joyce Anne Porter, Apex, NC (US); Christopher Meyer, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 16/935,824

(22) Filed: Jul. 22, 2020

(65) Prior Publication Data

US 2022/0030093 A1    Jan. 27, 2022

(51) Int. Cl.
| | |
|---|---|
| *H04L 69/16* | (2022.01) |
| *H04L 69/163* | (2022.01) |
| *G06F 11/20* | (2006.01) |
| *H04L 67/1001* | (2022.01) |
| *H04L 43/10* | (2022.01) |

(52) U.S. Cl.
CPC ........ *H04L 69/161* (2013.01); *G06F 11/2033* (2013.01); *H04L 43/10* (2013.01); *H04L 67/1002* (2013.01); *H04L 69/163* (2013.01)

(58) Field of Classification Search
None
See application file for complete search history.

(56) References Cited

U.S. PATENT DOCUMENTS

| | | | |
|---|---|---|---|
| 5,951,650 A | 9/1999 | Bell et al. | |
| 8,036,105 B2 | 10/2011 | Arrowood et al. | |
| 9,515,869 B2 | 12/2016 | Ngo | |
| 2004/0054766 A1* | 3/2004 | Vicente | H04W 28/16 709/223 |
| 2007/0058525 A1* | 3/2007 | Arrowood | H04L 41/0663 370/216 |

OTHER PUBLICATIONS

White et al—IBM Z/OS V2R2 Communications Server TCP/IP Implementation: vol. 3 High Availability ,Scalability and Performance IBM Redbooks—Aug. 2016 (Year: 2016).*
Paola et al.—Z/OS Planned Outage Avoidance Checklist (Year: 2006).*

* cited by examiner

*Primary Examiner* — Younes Naji
(74) *Attorney, Agent, or Firm* — Teddi E. Maranzano

(57) ABSTRACT

A method, system, and program product are provided. A plurality of recovery groups is defined on each transmission control protocol/internet protocol (TCP/IP) stack in a cluster of servers. The recovery group includes a service, one or more IP addresses associated with the service, a trigger condition, and a recovery action. Each of the recovery groups is monitored for an occurrence of the trigger condition associated with the service. In response to detecting the trigger condition, a backup TCP/IP stack is notified to automatically perform the recovery action defined for a failing recovery group on an owning TCP/IP stack. Only the failing recovery group is recovered and the remaining recovery groups execute uninterrupted.

17 Claims, 7 Drawing Sheets

SELECTIVE TCP/IP STACK RECONFIGURATION

BACKGROUND

This disclosure relates generally to network communications and more particularly to network communications in a cluster of computer systems.

An operating system, such as z/OS, can monitor a Transmission Control Protocol/Internet Protocol (TCP/IP) stack for a defined set of problem conditions. In response, the default recovery action is to delete all the dynamic virtual IP addresses (DVIPA) the TCP/IP stack owns and to remove the TCP/IP stack from the cluster. This allows a healthy backup TCP/IP stack to assume the DVIPAs and the functions of the failed stack.

It would be advantageous to recover the failing DVIPAs without disrupting the entire TCP/IP stack.

SUMMARY

According to one embodiment, a method is provided. A plurality of recovery groups is defined on each transmission control protocol/internet protocol (TCP/IP) stack in a cluster of servers. The recovery group includes a service, one or more IP addresses associated with the service, a trigger condition, and a recovery action. Each of the recovery groups is monitored for an occurrence of the trigger condition associated with the service. In response to detecting the trigger condition, a backup TCP/IP stack is notified to automatically perform the recovery action defined for a failing recovery group on an owning TCP/IP stack. Only the failing recovery group is recovered and the remaining recovery groups execute uninterrupted.

According to another embodiment, a computer program product is provided. The computer program product includes a computer readable storage medium readable by a processing circuit and storing instructions for execution by the processing circuit for performing a method. A plurality of recovery groups is defined on each transmission control protocol/internet protocol (TCP/IP) stack in a cluster of servers. The recovery group includes a service, one or more IP addresses associated with the service, a trigger condition, and a recovery action. Each of the recovery groups is monitored for an occurrence of the trigger condition associated with the service. In response to detecting the trigger condition, a backup TCP/IP stack is notified to automatically perform the recovery action defined for a failing recovery group on an owning TCP/IP stack. Only the failing recovery group is recovered and the remaining recovery groups execute uninterrupted.

According to another embodiment, a computer system is provided. The computer system comprises one or more processors, and a computer-readable memory coupled to the one or more processors, the computer-readable memory comprising instructions for defining a plurality of recovery groups on each transmission control protocol/internet protocol (TCP/IP) stack in a cluster of servers. The recovery group includes a service, one or more IP addresses associated with the service, a trigger condition, and a recovery action. Each of the plurality of recovery groups is monitored for an occurrence of the trigger condition associated with the service. In response to detecting the trigger condition, notifying a backup TCP/IP stack to automatically perform the recovery action defined for a failing recovery group on an owning TCP/IP stack, wherein only the failing recovery group is recovered and the remaining recovery groups execute uninterrupted.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
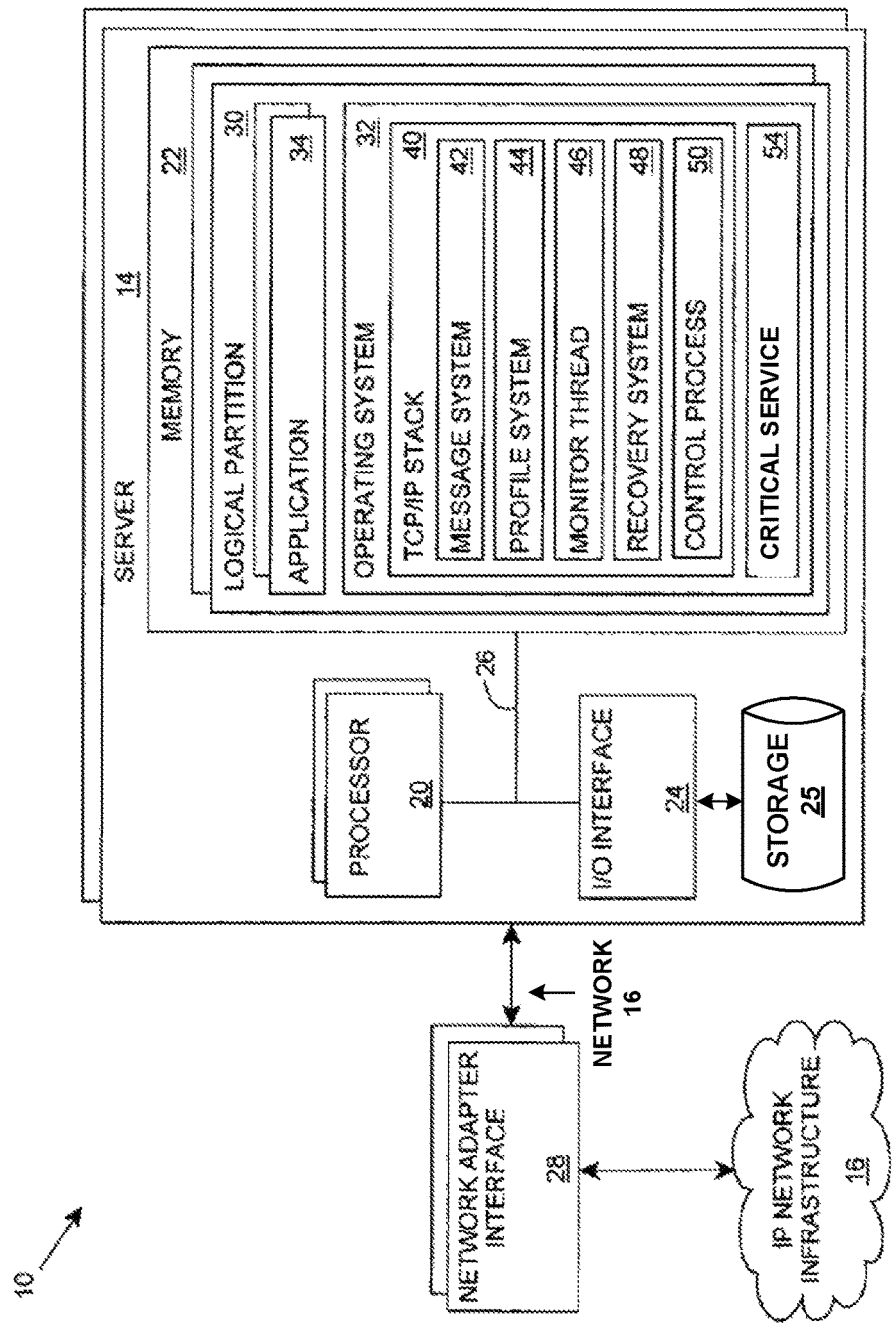
FIG. 1 shows an illustrative computing environment according to embodiments of the present invention.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more tangible computer readable medium(s) having computer readable program code embodied thereon.

Embodiments of the present invention are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

While the present invention is described as an embodiment of a z/OS Sysplex, as will be appreciated by those skilled in the art of clustered computing, the present invention may be practiced in other systems where clusters of computers utilize virtual addresses by associating an application or application group, rather than a particular communications adapter, with the addresses. Thus, the present invention should not be construed as limited to the particular exemplar embodiments described herein.

When sysplex (i.e., cluster) monitoring is enabled, the TCP/IP stack 40 monitors for a defined set of problem conditions that, when recognized, trigger a recovery action. In current practice, the recovery action is to remove the TCP/IP stack 40 from the sysplex, which inherently removes any DVIPAs the stack owns. One or more backup TCP/IP stacks 40 may take over the functions formerly provided by the failed TCP/IP stack 40. Removal may be an appropriate response for some problem conditions. For example, if the TCP/IP stack 40 is unable to obtain the storage needed to process a connection request, then all workloads will be negatively affected, and removal of the workload to a backup TCP/IP stack 40 is appropriate.

However, there may be a subset of DVIPAs using a specific function or unique set of resources. These DVIPAs form a common need, such as a service, and can form a DVIPA recovery group. There may be more than one DVIPA recovery group, each monitoring a different set of DVIPAs. Each DVIPA recovery group can be uniquely monitored and have a specific recovery action applied just to that DVIPA recovery group. Therefore, it is not necessary to remove the TCP/IP stack 40, as the recovery action only applies to the DVIPAs in the failing DVIPA recovery group.

For example, a DVIPA recovery group may be defined for the IP security (IPSec) service. If a problem is detected with one of the IPSec components, such as the Internet Key Exchange daemon (IKED), removing the entire TCP/IP stack 40 is unnecessarily disruptive to the remaining workloads on the stack. Therefore, taking the defined recovery action for the DVIPA recovery group, typically moving the DVIPA recovery group to a healthy backup TCP/IP stack 40, would allow the remaining workloads to execute uninterrupted.

The sysplex monitoring facility enables the TCP/IP stack 40 to recognize the creation of DVIPA recovery groups, each of which can be independently enabled and controlled. This is done by enhancing the sysplex monitoring facility to accept input parameters that define the service to monitor, specific resources required, a recovery action, and conditions to monitor for each of the DVIPA recovery groups. Parameters to the sysplex monitoring facility also define when and/or if the DVIPA recovery group can return to the owning TCP/IP stack 40. For example, the recovery group can return automatically if the owning TCP/IP stack 40 regains health. "Health" is generally a measure of the server having the resources and performance characteristics that the enterprise defines as being acceptable for being in the production environment. A "full recovery" recovery action specifies that for a monitored service in a DVIPA recovery group, remove all DVIPAs and force the TCP/IP stack 40 to leave the sysplex. An additional recovery action is to monitor the DVIPA recovery group and issue appropriate messages when the health changes, but take no other recovery action.

FIG. 1 shows an exemplary computing environment 10 according to embodiments of the present invention.

The environment 10 includes a cluster of systems/servers 14 that communicate over a network 16 using a set of network adapter interfaces 28. The server 14 includes one or more processors 20, a memory 22, an input/output (I/O) interface 24 and a bus 26. The memory 22 can include a plurality of logical partitions 30, each of which includes an operating system 32, which can run one or more applications 34. The processors 20 execute computer program code, such as the applications 34, that are stored in the memory 22. The processors 20 can read and/or write data to/from the memory 22 and/or the storage 25 connected to the I/O interface 24. The bus 26 provides a communication link between each of the components in the server 14. The I/O interface 24 comprises any device that enables interaction with the server 14, and/or enables the server to communicate with one or more other computing devices, such as the network adapter interface 28 and the storage 25.

Communications between the applications 34 and one or more nodes (e.g., computing devices, applications, etc.) connected to the network 16 can use the Transmission Control Protocol/Internet Protocol (TCP/IP). The network 16 comprises any combination of networks, such as Internet, Wide Area Network Local Area Network, and Virtual Private Network. In order to process messages in a particular communications protocol, the operating system 32 includes an implementation of the communication protocol, for example, the TCP/IP stack 40. The operating system can include a critical service 54 upon which the devices in a particular recovery group depend for successful operation. To process messages, the TCP/IP stack 40 may include a message system 42, a profile system 44, a monitor thread 46, a recovery system 48, and a control process 50.

Figure 2:
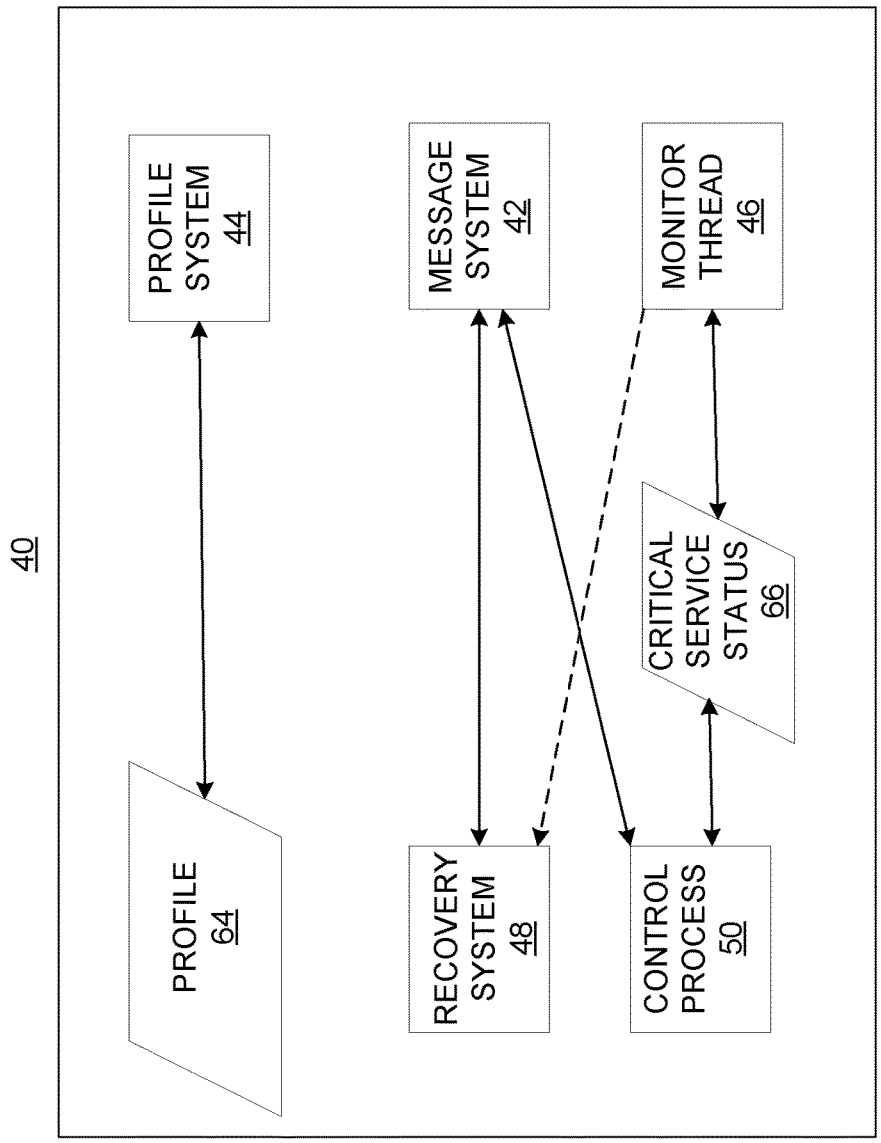
FIG. 2 shown an illustrative data flow that can be implemented by the Transmission Control Protocol/Internet Protocol (TCP/IP) stack of FIG. 1, according to various embodiments of the present invention.

FIG. 2 shows an exemplary data flow that can be implemented by the TCP/IP stack 40 of FIG. 1, according to various embodiments of the present invention.

The message system 42 receives a TCP/IP message (not shown), and forwards the message data to a destination, such as one or more of the applications 34 (FIG. 1). Additionally, the message system 42 may generate TCP/IP messages (not shown), and forward them to another TCP/IP stack 40 in the sysplex (cluster) of servers 14. The control process 50 may participate with the critical service 54 in the successful processing of the TCP/IP messages.

When one or more components of the TCP/IP stack 40 is failing, the TCP/IP stack 40 may be unable to implement the functionality of the DVIPA. To prevent or minimize failures, the TCP/IP stack 40 may monitor for the occurrence of defined conditions in the TCP/IP stack 40. The monitoring may include a profile system 44 and one or more profiles 64. The profile 64 includes the problem conditions to monitor, what triggers the problem event, what recovery actions to take, and how frequently the monitor thread 46 should execute. The profile system 44 provides an interface (not shown) for reading, creating, and modifying the profile 64. The profile system 44 provides the profile 64 to the monitor thread 46. The monitor thread 46 may monitor several problem conditions that are defined for the TCP/IP stack 40. Alternatively, the TCP/IP stack 40 may include several monitor threads 46, one for each defined problem condition. The monitor thread 46 sets a critical service status 66 for each detected problem condition. The monitor thread 46 notifies the recovery system 48 to take the defined recovery action.

Figure 3:
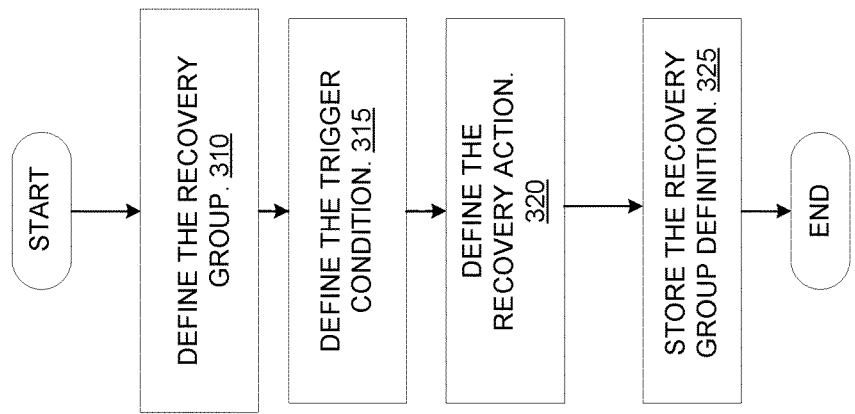
FIG. 3 is a flowchart illustrating configuring a recovery group, according to various embodiments of the present invention.

FIG. 3 illustrates configuring a recovery group, according to various embodiments of the present invention.

At 310, the recovery group is defined along with the service on which it depends. This definition may be an explicit configuration action, such as entering a list of DVIPA addresses. For example, the listed DVIPAs (1.1.1.1, 1.1.1.2 and 1.1.1.3) depend on the IKED service. Alternatively, the service can be identified by name, e.g., IKED, in which case the TCP/IP stack 40 dynamically locates the service name in system configuration files which define that DVIPAs 1.1.1.1, 1.1.1.2 and 1.1.1.3 are associated with IKED.

At 315, the trigger conditions are defined, several of which are possible, depending on the implementation. Examples of trigger conditions include exceeding some elapsed time between events, missing heartbeats, an explicit amount of time, and exceeding or underflowing some threshold value of a counter.

At 320, the recovery action is defined. Recovery actions include relocating the DVIPA recovery group to a backup TCP/IP stack 40, issuing a console message, or deleting the IP addresses from the configuration of the failing TCP/IP stack 40 and removing the TCP/IP stack 40 from the sysplex. Some recovery action is mandatory, even if that is issuing a console message.

At 325, the profile system 44 stores the recovery group definition as a profile 64 in the storage 25 that the profile system 44 can access. The recovery group definition, trigger condition, and recovery action may be entered through an interface to the profile system 44 (not shown). An administrator may modify or delete, and activate or deactivate a profile 64 through the interface to the profile system 44. Each recovery group definition can be saved as a separate profile 64 entry in the profile system 44.

Figure 4:
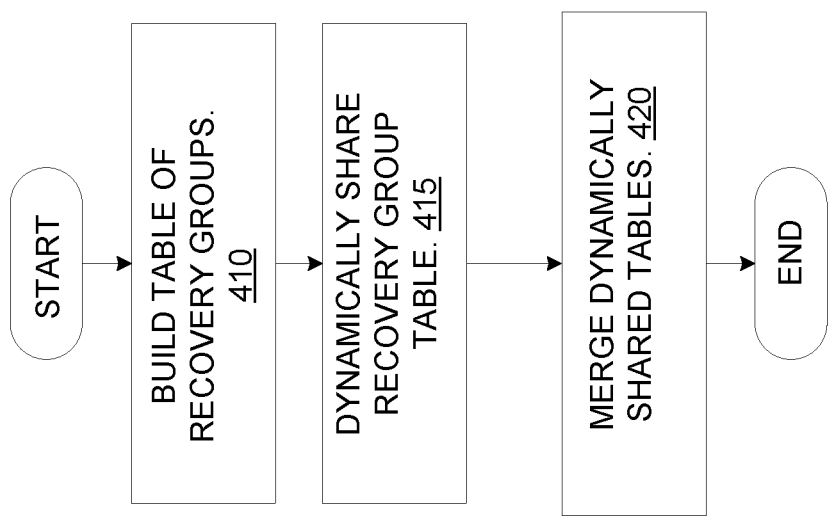
FIG. 4 is a flowchart illustrating TCP/IP stack initialization, according to various embodiments of the present invention.

FIG. 4 illustrates TCP/IP stack 40 initialization, according to various embodiments of the present invention.

At 410, each TCP/IP stack 40 in the sysplex builds a table of the DVIPA recovery groups that are defined as being owned by that stack. The following table, Table I, is an example of the information that can be input to a table of DVIPA recovery groups. Each row represents one profile 64 entry, i.e., one DVIPA recovery group. The profile system 44 converts the information to a format that the monitor thread 46 and recovery system 48 can execute.

It should be noted that components outside of operating system 32, such as applications or custom infrastructure that provide critical services, can provide their own customized monitoring logic in the form of executable code that is invoked at appropriate times by TCP/IP stack 40 through a well-defined programming exit interface. When the component-supplied exit is added to the operating system 32, the protection of the monitor thread 46 and the recovery system 48 can be extended to that executable code. For example, "UserSvc" in Table I, is a component-supplied service from a component-defined recovery group for component-supplied executable code. The trigger condition can include an indicator, such as a flag, or a condition code, depending on the logic implemented in the component-supplied exit. In the example of Table I, the monitor thread 46 recognizes the component-supplied indicator, and executes the recovery action, which is to issue a user-defined message on the system console. A failure in any of the monitored DVIPAs, 1.1.2.1, 1.1.3.1, or 1.1.4.1, will trigger the condition.

TABLE I

Example Recovery Group Table

| Service | Trigger Condition | Recovery Action | Member DVIPAs |
|---|---|---|---|
| IKED | 2 consecutive missed heartbeats | Move DVIPA to healthy backup stack | 1.1.1.1, 1.1.1.2, 1.1.1.3 |
| UserSvc | Flag from user supplied monitor exit | Issue console message | 1.1.2.1, 1.1.3.1, 1.1.4.1 |

If the list of member DVIPAs for any of the recovery groups is identified dynamically, e.g., by service name, the profile system 44 invokes discovery logic to determine which DVIPAs are associated with the service name, and adds them to the recovery table.

At 415, each TCP/IP stack 40 sends its local recovery table to all members of the sysplex.

At 420, each TCP/IP stack 40 dynamically merges each of the received recovery group tables into one global table comprising all the recovery groups in the sysplex. Alternatively, one global table comprising all of the recovery groups can be built on one sysplex member, and that table can be distributed to the rest of the sysplex members. In another approach, each member of the sysplex is separately configured with the global table of recovery group information, whereby exchanging recovery tables among sysplex members is avoided.

The TCP/IP stack 40 must also be prepared for a dynamic modification of its merged DVIPA recovery table. For example, when a DVIPA is varied offline or a DVIPA is added to the configuration, the TCP/IP stack 40 dynamically updates its DVIPA recovery table accordingly. The TCP/IP stack 40 notifies the other member TCP/IP stacks 40 in the sysplex of the configuration change, and the member TCP/IP stacks 40 update their global tables accordingly.

Figure 5:
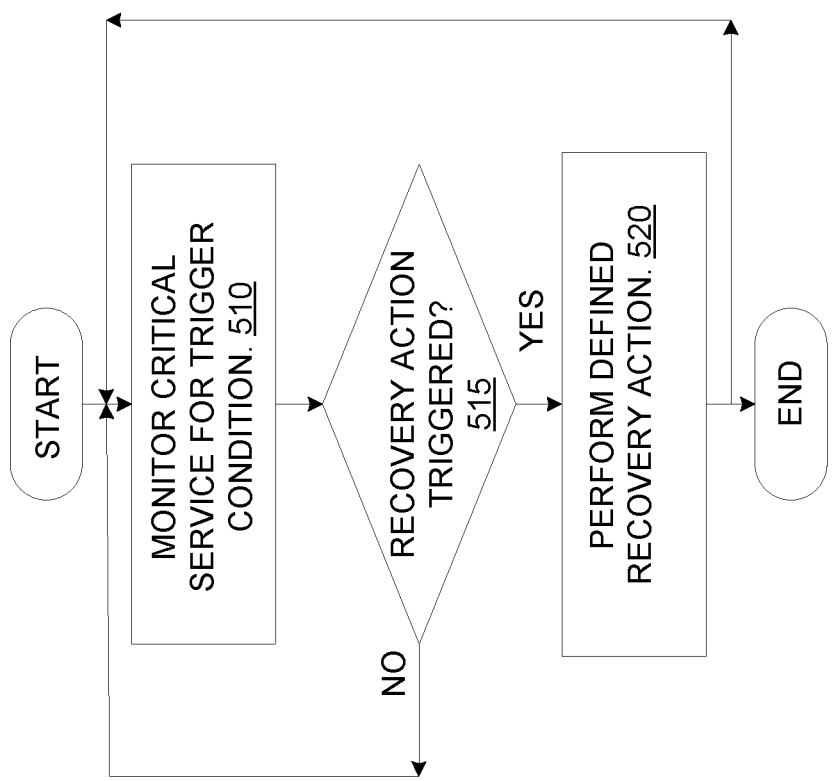
FIG. 5 is a flowchart illustrating monitoring the recovery group, according to various embodiments of the present invention.

FIG. 5 illustrates monitoring the recovery group, according to various embodiments of the present invention.

At 510, the monitor thread 46 of the TCP/IP stack 40 monitors the defined critical services of the DVIPA recovery groups to detect any occurrence of a trigger condition. As described above with reference to FIG. 4, each DVIPA recovery group can define a different trigger condition, and there can be more than one trigger condition (and recovery action) defined for each service. As an example, a DVIPA (or DVIPAs) can define two different resources as critical. In that case, a missing heartbeat from either resource can trigger a recovery action. For example, where the trigger condition is regular receipt of a heartbeat message from the critical resource, the absence of the pre-defined number of consecutive heartbeat messages triggers the recovery action. Alternatively, internal triggers such as exceeding some elapsed time between events, exceeding or underflowing some threshold value of a counter, or any number of other indicators can serve as the trigger.

For DVIPA recovery groups protecting component-provided critical services, the service must provide its own monitoring function which the TCP/IP stack 40 calls at some regular interval through a well-defined programming interface. The value returned by the service's monitor function determines whether a recovery action is triggered. For example, a return value of "0" indicates a stable environment and a non-zero value can trigger the recovery action. The interface can also be defined to include other return values that provide more granular state information to the stack (for example, "4" means warning and "8" means error). When a recovery action is triggered on any monitoring interval, the TCP/IP stack 40 invokes existing capabilities to relinquish ownership of the DVIPAs, allowing the DVIPAs to move to a healthy backup TCP/IP stack 40.

At 515, the monitor thread 46 of the TCP/IP stack 40 compares the trigger conditions in each of the DVIPA recovery groups to actual conditions in the TCP/IP stack 40 to determine whether a recovery action is triggered. If a trigger condition is not recognized, monitoring continues at 510.

At 520, the TCP/IP stack 40 initiates the defined recovery action when the trigger condition is recognized. This may include the takeover of the failing DVIPA recovery group by a healthy TCP/IP stack 40, issuing a message, or taking the action otherwise defined in the implementation. Additionally, multiple recovery actions can be defined as a recovery action. For example, a message is issued to the system console and the failing DVIPAs are removed from the TCP/IP stack 40, thereby allowing the takeover to occur.

Figure 6:
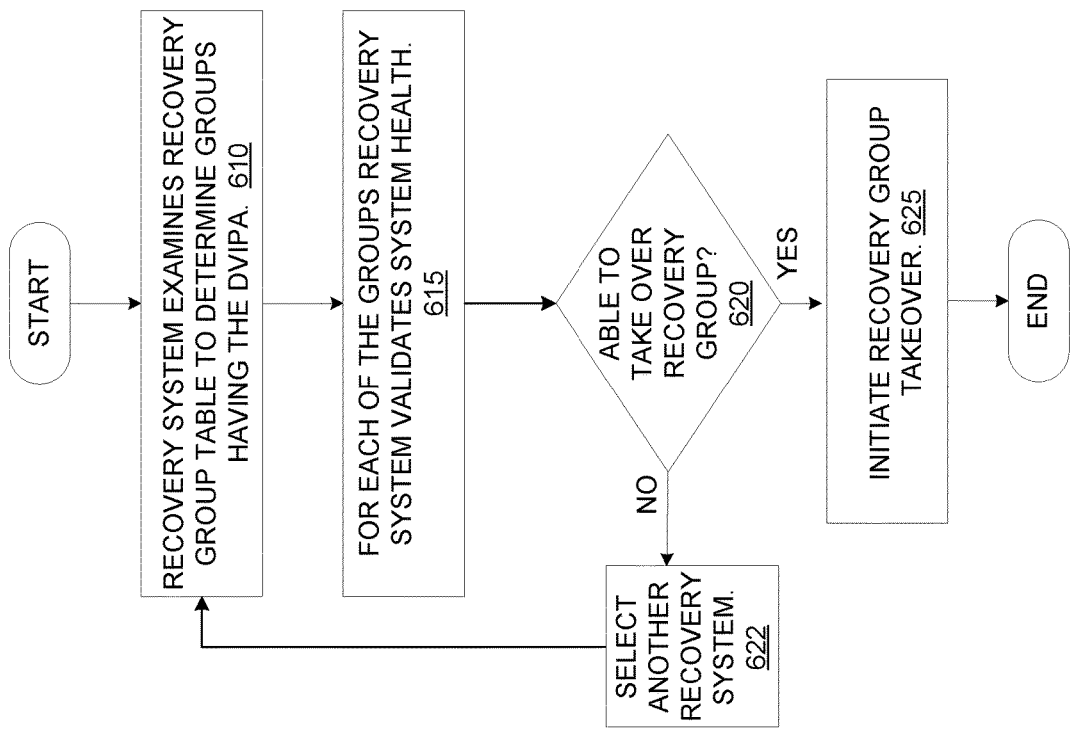
FIG. 6 is a flowchart illustrating the recovery group takeover, according to various embodiments of the present invention.

FIG. 6 illustrates recovery group takeover by a backup TCP/IP stack 40.

At 610, the backup TCP/IP stack 40 discovers it is the backup stack for the failing DVIPA(s) when the failing TCP/IP stack 40 removes them.

At 615, the backup TCP/IP stack 40 validates its health to determine whether it can take over the DVIPA recovery group in question. For each of the DVIPA recovery groups identified for takeover, the TCP/IP stack 40 determines if it has the critical resources around which the DVIPA recovery groups are built are available. Such resources include, but are not limited to, the critical service, sockets, memory for buffers, and physical and logical ports.

If, at 620, the TCP/IP stack 40 determines that its health does not meet the global recovery table requirements, then the takeover cannot be initiated. In that case, at 622, another backup TCP/IP stack 40 in a prioritized list of backup stacks is selected for the takeover. However, if all the required critical resource are available and functioning properly, then at 625, TCP/IP stack 40 can initiate recovery operations for the DVIPA recovery groups.

In some cases, the original owning TCP/IP stack 40 of the recovered DVIPA recovery group may regain health. In that case, the DVIPA recovery group can be configured to automatically return to the original owning TCP/IP stack 40.

Figure 7:
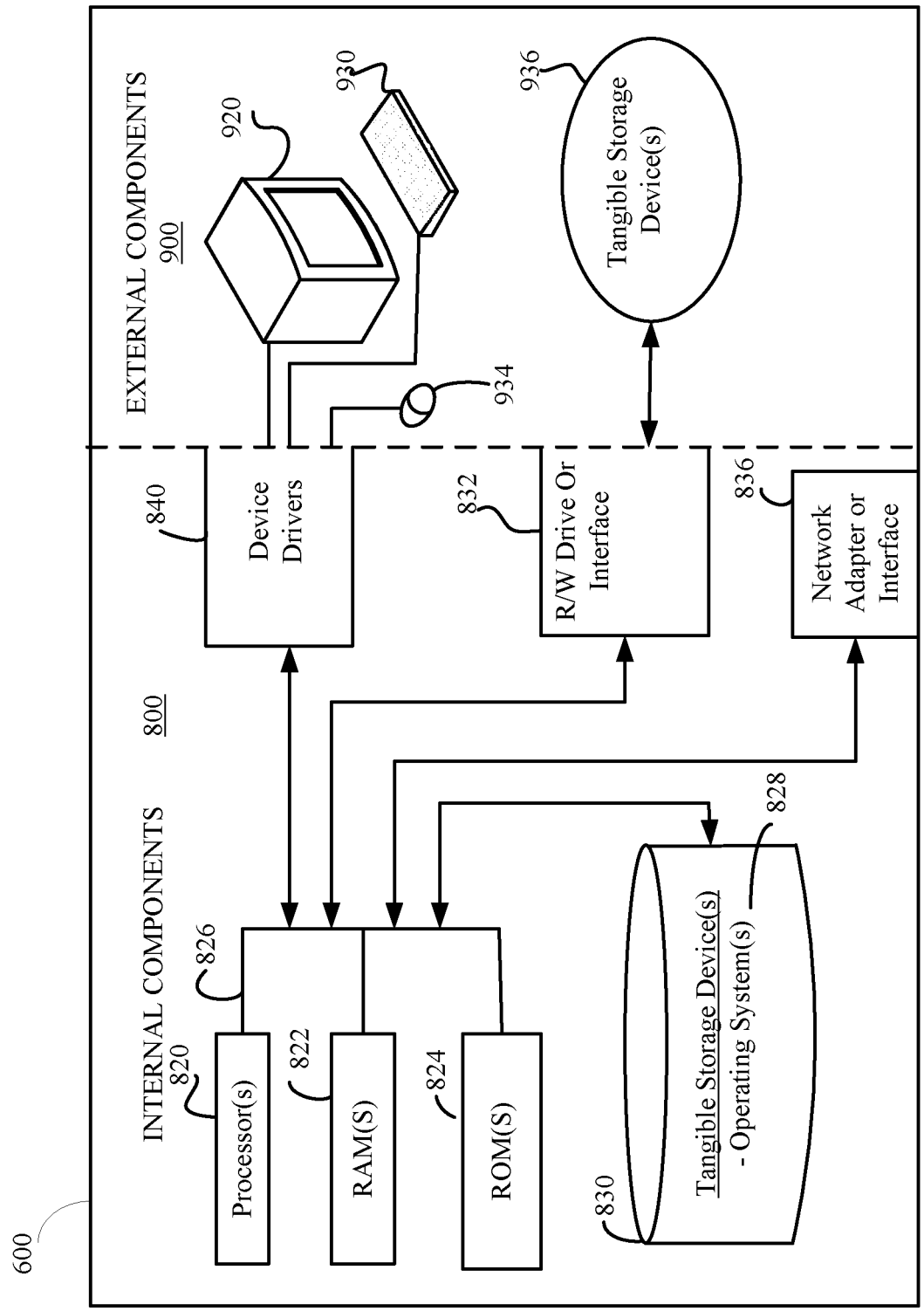
FIG. 7 is a schematic block diagram of hardware and software of the computer environment according to an embodiment of the processes of FIGS. 3-6.

Referring now to FIG. 7, computing device 600 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the method of FIGS. 3-6; and one or more tangible storage devices 830. The one or more operating systems 828 are stored on one or more of the respective tangible storage devices 830 for execution by one or more of the respective processors 820 via one or more of the respective RAMs 822 (which typically include cache memory). In the embodiment illustrated in FIG. 6, each of the tangible storage devices 830 is a magnetic disk storage device of an internal hard drive. Alternatively, each of the tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more tangible storage devices 936 such as a CD-ROM, DVD, SSD, memory stick, magnetic tape, magnetic disk, optical disk, or semiconductor storage device.

Each set of internal components 800 may also include network adapters (or switch port cards) or interfaces 836 such as a TCP/IP adapter cards, wireless WI-FI interface cards, or 3G, 4G, or 5G wireless interface cards or other wired or wireless communication links. The operating system 828 that is associated with computing device 600, can be downloaded to computing device 600 from an external computer (e.g., server) via a network (for example, the Internet, a local area network, or other wide area network) and respective network adapters or interfaces 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in tangible storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:
1. A method comprising:
defining a plurality of recovery groups on each transmission control protocol/internet protocol (TCP/IP) stack in a cluster of servers, wherein the recovery group includes a service, IP addresses associated with the service, a trigger condition, and a recovery action;
monitoring each of the plurality of recovery groups for an occurrence of the trigger condition associated with the service; and
in response to detecting the trigger condition, notifying a backup TCP/IP stack to automatically perform the recovery action defined for a failing recovery group on an owning TCP/IP stack, searching, by the backup TCP/IP stack a global table of recovery groups for the IP addresses associated with the failing recovery group; and
for each IP address associated with the failing recovery group, validating that the backup TCP/IP stack has resources to perform the recovery action before initiating takeover of the failing recovery group, and wherein the resources include a critical service, sockets, buffer memory, and physical and logical ports; and recovering only the failing recovery group, wherein remaining recovery groups execute uninterrupted.

2. The method of claim 1, wherein defining the plurality of recovery groups further comprises:

building, by each TCP/IP stack, a table of recovery groups that are defined on each of TCP/IP stacks;

dynamically sharing the table of recovery groups among the TCP/IP stacks; and merging, by each TCP/IP stack, each of the shared table of recovery groups into the global table of recovery groups, resulting in a copy of the global table of recovery groups residing at each TCP/IP stack.

3. The method of claim 1, wherein the trigger condition includes one or more of:

missing a regular receipt of a heartbeat message from a critical resource associated with the service;

an absence of a pre-defined number of consecutive heartbeat messages;

exceeding an elapsed time between events; and exceeding or underflowing a threshold value.

4. The method of claim 1, wherein after the failed recovery group being moved to the backup TCP/IP stack, the failed recovery group moves back to the owning TCP/IP stack based on a recovery group definition.

5. The method of claim 1, wherein the TCP/IP stack dynamically updates its global recovery table in response to detecting a change in a recovery group definition.

6. A computer program product comprising a computer readable storage medium readable by a processing circuit and storing instructions for execution by the processing circuit for performing a method comprising:

defining a plurality of recovery groups on each transmission control protocol/internet protocol (TCP/IP) stack in a cluster of servers, wherein the recovery group includes a service, IP addresses associated with the service, a trigger condition, and a recovery action;

monitoring each of the plurality of recovery groups for an occurrence of the trigger condition associated with the service; and in response to detecting the trigger condition, notifying a backup TCP/IP stack to automatically perform the recovery action defined for a failing recovery group on an owning TCP/IP stack, searching, by the backup TCP/IP stack a global table of recovery groups for the IP addresses associated with the failing recovery group; and for each IP address associated with the recovery group, validating that the backup TCP/IP stack has resources to perform the recovery action before initiating takeover of the failing recovery group, and wherein the resources include a critical service, sockets, buffer memory, and physical and logical ports; and recovering only the failing recovery group, wherein remaining recovery groups execute uninterrupted.

7. The computer program product of claim 6, wherein defining the plurality of recovery groups further comprises:

building, by each TCP/IP stack, a table of recovery groups that are defined on each of TCP/IP stacks;

dynamically sharing the table of recovery groups among the TCP/IP stacks; and merging, by each TCP/IP stack, each of the shared table of recovery groups into the global table of recovery groups, resulting in a copy of the global table of recovery groups residing at each TCP/IP stack.

8. The computer program product of claim 6, wherein the trigger condition includes one or more of:

missing a regular receipt of a heartbeat message from a critical resource associated with the service;

an absence of a pre-defined number of consecutive heartbeat messages;

exceeding an elapsed time between events; and exceeding or underflowing a threshold value.

9. The computer program product of claim 6, wherein after the failed recovery group being moved to the backup TCP/IP stack, the failed recovery group moves back to the owning TCP/IP stack based on a recovery group definition.

10. The computer program product of claim 6, wherein the TCP/IP stack dynamically updates its global recovery table in response to detecting a change in a recovery group definition.

11. A computer system, comprising:

one or more processors; and a computer-readable memory coupled to the one or more processors, the computer-readable memory comprising instructions for:

defining a plurality of recovery groups on each transmission control protocol/internet protocol (TCP/IP) stack in a cluster of servers, wherein the recovery group includes a service, IP addresses associated with the service, a trigger condition, and a recovery action;

monitoring each of the plurality of recovery groups for an occurrence of the trigger condition associated with the service; and in response to detecting the trigger condition, notifying a backup TCP/IP stack to automatically perform the recovery action defined for a failing recovery group on an owning TCP/IP stack, searching, by the backup TCP/IP stack a global table of recovery groups for the IP addresses associated with the failing recovery group; and for each IP address associated with the recovery group; validating that the backup TCP/IP stack has resources to perform the recovery action before initiating takeover of the failing recovery group, and wherein the resources include a critical service, sockets, buffer memory, and physical and logical ports; and recovering only the failing recovery group, wherein remaining recovery groups execute uninterrupted.

12. The computer system of claim 11, wherein defining the plurality of recovery groups further comprises:

building, by each TCP/IP stack, a table of recovery groups that are defined on each of TCP/IP stacks;

dynamically sharing the shared table of recovery groups among the TCP/IP stacks; and merging, by each TCP/IP stack, each of the shared table of recovery groups into the global table of recovery groups, resulting in a copy of the global table of recovery groups residing at each TCP/IP stack.

13. The computer system of claim 11, wherein the trigger condition includes one or more of:

missing a regular receipt of a heartbeat message from a critical resource associated with the service;

an absence of a pre-defined number of consecutive heartbeat messages;

exceeding an elapsed time between events; and exceeding or underflowing a threshold value.

14. The computer system of claim 11, wherein after the failed recovery group being moved to the backup TCP/IP stack, the failed recovery group moves back to the owning TCP/IP stack based on a recovery group definition.

15. The computer system of claim 11, wherein the TCP/IP stack dynamically updates its global recovery table in response to detecting a change in a recovery group definition.

16. The computer system of claim 11, wherein the service is defined in the recovery group, the TCP/IP stack invokes discovery logic to discover the IP addresses associated with the service, and the TCP/IP stack adds the discovered IP addresses to the recovery group.

17. The computer system of claim 11, wherein the recovery action includes: issuing a console message, moving the IP addresses of the failing recovery group to the backup TCP/IP stack, or deleting the IP addresses from the TCP/IP stack that detected the trigger condition.

* * * * *